(12) United States Patent
Beauvais

(10) Patent No.: US 10,166,995 B2
(45) Date of Patent: Jan. 1, 2019

(54) SYSTEM AND METHOD FOR FEATURE ACTIVATION VIA GESTURE RECOGNITION AND VOICE COMMAND

(71) Applicant: Ford Global Technologies, LLC, Dearborn, MI (US)

(72) Inventor: Brandon Beauvais, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 99 days.

(21) Appl. No.: 14/991,523

(22) Filed: Jan. 8, 2016

(65) Prior Publication Data

US 2017/0197636 A1   Jul. 13, 2017

(51) Int. Cl.
*B60W 50/10* (2012.01)
*B60W 50/00* (2006.01)
(Continued)

(52) U.S. Cl.
CPC ......... *B60W 50/10* (2013.01); *B60R 25/2045* (2013.01); *B60R 25/257* (2013.01);
(Continued)

(58) Field of Classification Search
CPC .. B60W 50/10; B60W 30/06; B60W 2420/42; B60W 2050/0063;
(Continued)

(56) References Cited

U.S. PATENT DOCUMENTS 2,648,072 A    8/1953  De Blieux
6,498,970 B2 * 12/2002  Colmenarez ........ B60R 25/2045
                                                        382/116
(Continued)

FOREIGN PATENT DOCUMENTS

DE   102006006362 A1   5/2007
DE   102012216174 A1   5/2014
(Continued)

OTHER PUBLICATIONS

Cheng et al, "Vision-Based Infotainment User Determination by Hand Recognition for Driver Assistance", IEEE Transactions on Intelligent Transportation Systems, vol. 10, No. 3, 2010, pp. 759-764.*

(Continued)

*Primary Examiner* — Russell Frejd
(74) *Attorney, Agent, or Firm* — James P. Muraff; Neal, Gerber & Eisenberg LLP

(57) ABSTRACT

Various embodiments of the present disclosure provide a system and method for activating a vehicle feature through gesture recognition and voice command by an authorized user. Generally, a vehicle control system of the present disclosure obtains gesture commands and voice commands from an authorized user and communicates with a body control module to complete the vehicle feature. More specifically, in certain embodiments, a processor of the vehicle control system is configured to initiate a feature activation mode of a vehicle control system, authenticate an authorized user, receive a gesture command and a voice command, determine a vehicle feature associated with the received gesture command and voice command, and activate the determined feature in response to the recognized gesture command and voice command.

20 Claims, 3 Drawing Sheets

(51) Int. Cl.
| | |
|---|---|
| *B60W 30/06* | (2006.01) |
| *B60R 25/20* | (2013.01) |
| *B60R 25/25* | (2013.01) |
| *G06F 3/16* | (2006.01) |
| *G06F 3/01* | (2006.01) |

(52) U.S. Cl.
CPC ............. *B60W 30/06* (2013.01); *G06F 3/017* (2013.01); *G06F 3/167* (2013.01); *B60W 2050/0063* (2013.01); *B60W 2420/42* (2013.01); *B60W 2420/54* (2013.01); *B60W 2540/02* (2013.01); *B60W 2540/04* (2013.01); *B60W 2540/28* (2013.01); *G06F 2203/0381* (2013.01)

(58) Field of Classification Search
CPC ......... B60W 2420/54; B60W 2540/02; B60W 2540/04; B60W 2540/28; G06F 3/017; G06F 3/167; G06F 17/20; G06F 2203/0381; G01C 21/3629; G01C 21/3664; B60R 16/0373; G06K 9/00362; B60K 2350/1052
See application file for complete search history.

(56) References Cited

U.S. PATENT DOCUMENTS

| | | | | |
|---|---|---|---|---|
| 6,545,670 | B1* | 4/2003 | Pryor | G06F 3/0425 |
| | | | | 345/156 |
| 6,614,422 | B1* | 9/2003 | Rafii | G06F 1/1626 |
| | | | | 345/156 |
| 6,710,770 | B2* | 3/2004 | Tomasi | G06F 1/1613 |
| | | | | 345/156 |
| 7,489,303 | B1* | 2/2009 | Pryor | B60K 35/00 |
| | | | | 345/173 |
| 7,527,288 | B2* | 5/2009 | Breed | B60R 21/013 |
| | | | | 280/735 |
| 7,920,102 | B2* | 4/2011 | Breed | B60K 35/00 |
| | | | | 340/991 |
| 8,296,151 | B2* | 10/2012 | Klein | G06F 3/017 |
| | | | | 382/181 |
| 9,092,394 | B2* | 7/2015 | Dokor | G06F 17/20 |
| 2005/0134117 | A1* | 6/2005 | Ito | B60R 16/0373 |
| | | | | 307/10.1 |
| 2006/0004486 | A1* | 1/2006 | Yoshikawa | B60W 50/14 |
| | | | | 700/245 |
| 2007/0057781 | A1* | 3/2007 | Breed | B60K 35/00 |
| | | | | 340/457.1 |
| 2008/0059199 | A1* | 3/2008 | Hataoka | G01C 21/36 |
| | | | | 704/275 |
| 2008/0211779 | A1* | 9/2008 | Pryor | G01C 21/3664 |
| | | | | 345/173 |
| 2010/0085147 | A1 | 4/2010 | McCall | |
| 2010/0182137 | A1* | 7/2010 | Pryor | G01C 21/3664 |
| | | | | 340/425.5 |
| 2010/0185341 | A1 | 7/2010 | Wilson et al. | |
| 2011/0037725 | A1* | 2/2011 | Pryor | G01C 21/3664 |
| | | | | 345/174 |
| 2011/0202862 | A1* | 8/2011 | Kramer | B60K 35/00 |
| | | | | 715/771 |
| 2013/0275875 | A1* | 10/2013 | Gruber | G10L 15/22 |
| | | | | 715/728 |
| 2014/0058584 | A1* | 2/2014 | Weng | G06F 7/00 |
| | | | | 701/1 |
| 2014/0121883 | A1* | 5/2014 | Shen | B62D 15/0285 |
| | | | | 701/28 |
| 2014/0258880 | A1* | 9/2014 | Holm | H04L 65/40 |
| | | | | 715/748 |
| 2014/0309864 | A1* | 10/2014 | Ricci | H04W 48/04 |
| | | | | 701/36 |
| 2014/0309885 | A1* | 10/2014 | Ricci | H04W 48/04 |
| | | | | 701/41 |
| 2015/0077235 | A1* | 3/2015 | Pisz | B60R 25/104 |
| | | | | 340/426.23 |
| 2015/0081167 | A1 | 3/2015 | Pisz et al. | |
| 2015/0085127 | A1* | 3/2015 | Kramer | B60K 35/00 |
| | | | | 348/148 |
| 2015/0336588 | A1* | 11/2015 | Ebner | G01C 21/3629 |
| | | | | 701/2 |

FOREIGN PATENT DOCUMENTS

| | | |
|---|---|---|
| EP | 2767436 A2 | 10/1956 |
| WO | WO 2009/009005 A1 | 1/2009 |
| WO | WO 2009/118183 | * 10/2009 |

OTHER PUBLICATIONS

Martin Randlehoff, "Linked Telematics Solution with Augmented Reality—AIDA 2.0", Published Sep. 1, 2011, 15 pages, www.zukunft-mobilitaet.net/5086/strassenverkehr/aida2-navigation-mit-vw-audi-3d/.*

Christopher Mentzer, Signal Identification Using Gesture Notifications for Advanced Launching (SIGNAL)—Funded by AM General LLC, SwRI, http://www.swri.org/4org/d10/isd/ivs/signal.htm.

Search Report dated Jun. 29, 2017 for GB Patent Application No. GB1701478.8 (4 Pages).

* cited by examiner

SYSTEM AND METHOD FOR FEATURE ACTIVATION VIA GESTURE RECOGNITION AND VOICE COMMAND

TECHNICAL FIELD

This application generally relates to remote latch release of a vehicle. More specifically, the application relates to a triggered release of a latch, such to unlock the vehicle doors or release the trunk, when the vehicle user approaches the vehicle.

BACKGROUND

Vehicles include various systems for a user to control various vehicle functions through commands by the user from within the vehicle. Many vehicles include a remote keyless system (RKS) for enabling control of various vehicle functions, such as locking and unlocking the doors and releasing the trunk, without using a traditional key or other mechanical device, or otherwise making physical contact with the vehicle. Typically, remote keyless systems include a remote control comprising buttons or switches for enabling control of vehicle functions. The remote control may be in the form of an independent key fob separate from an ignition key of the vehicle, or a key fob built into the ignition key handle.

However, for other vehicle control systems such as self-parking or unparking, a user may wish to activate these features without entering the vehicle. Furthermore, a user may find that certain features are more convenient to operate from outside of the vehicle. Accordingly, there is still a need in the art for a system and method to control certain vehicle features from outside of a vehicle by an authorized user.

Certain features may be more convenient to turn on/off from outside the vehicle (line of sight). Such a configuration enables a user to activate certain features of the vehicle without entering the vehicle.

SUMMARY

Various embodiments of the present disclosure provide a system and method for activating a vehicle feature through gesture recognition and voice command by an authorized user. Generally, a vehicle control system of the present disclosure obtains gesture commands and voice commands from an authorized user and communicates with a body control module to complete the vehicle feature. More specifically, in certain embodiments, a processor of the vehicle control system is configured to initiate a feature activation mode of a vehicle control system, authenticate an authorized user, receive a gesture command and a voice command, determine a vehicle feature associated with the received gesture command and voice command, and activate the determined feature in response to the recognized gesture command and voice command.

As will be appreciated, this disclosure is defined by the appended claims. The description summarizes aspects of the embodiments and should not be used to limit the claims. Other implementations are contemplated in accordance with the techniques described herein, as will be apparent to one having ordinary skill in the art upon examination of the following drawings and detail description, and such implementations are intended to within the scope of this application.

BRIEF DESCRIPTION OF THE DRAWINGS

For a better understanding of the invention, reference may be made to embodiments shown in the following drawings. The components in the drawings are not necessarily to scale and related elements may be omitted, or in some instances proportions may have been exaggerated, so as to emphasize and clearly illustrate the novel features described herein. In addition, system components can be variously arranged, as known in the art. Further, in the drawings, like reference numerals designate corresponding parts throughout the several views.

DETAILED DESCRIPTION OF EXAMPLE EMBODIMENTS

Figure 1:
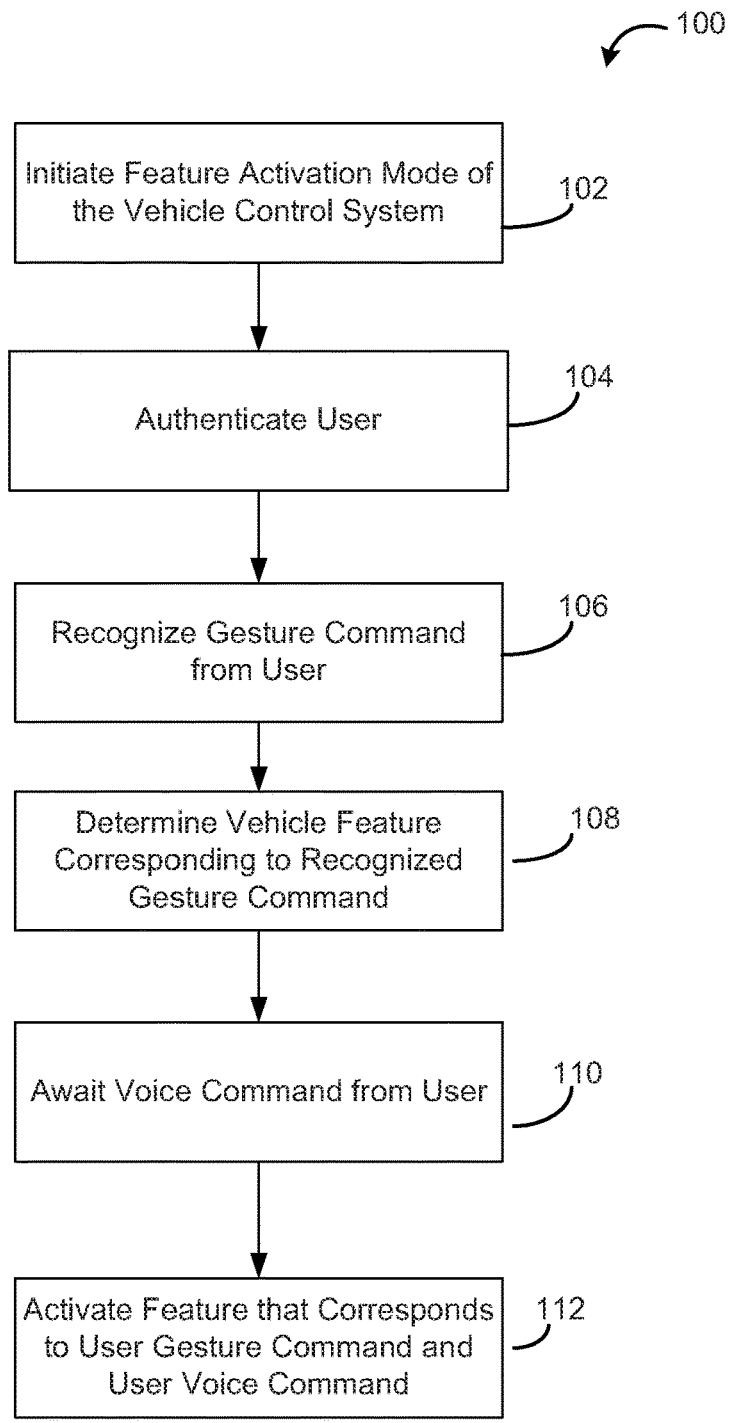
FIG. 1 is a flow chart of one example embodiment of the feature activation system and method of the present disclosure.

While the invention may be embodied in various forms, there are shown in the drawings, and will hereinafter be described, some exemplary and non-limiting embodiments, with the understanding that the present disclosure is to be considered an exemplification of the invention and is not intended to limit the invention to the specific embodiments illustrated.

In this application, the use of the disjunctive is intended to include the conjunctive. The use of definite or indefinite articles is not intended to indicate cardinality. In particular, a reference to "the" object or "a" and "an" object is intended to denote also one of a possible plurality of such objects.

Various embodiments of the present disclosure provide a system and method for activating a vehicle feature through gesture recognition and voice command by an authorized user. Generally, a vehicle control system of the present disclosure obtains gesture commands and voice commands from an authorized user and communicates with a body control module to complete the vehicle feature. More specifically, in certain embodiments, a processor of the vehicle control system is configured to initiate a feature activation mode of a vehicle control system, authenticate an authorized user, receive a gesture command and a voice command, determine a vehicle feature associated with the received gesture command and voice command, and activate the determined feature in response to the recognized gesture command and voice command.

The components of the vehicle control system of the present disclosure (described in detail below) may be included on, within, or otherwise integrated with a vehicle. One or more of the components of the vehicle control system may be shared with one or more components of existing vehicle system.

The vehicle control system may be included in or otherwise usable with any suitable vehicle, such as (but not limited to): (1) a non-commercial passenger vehicle such as a sedan or a truck; (2) a commercial vehicle such as a tractor-trailer; or (3) a non-civilian vehicle such as a vehicle used by a law enforcement agency, a government agency, an emergency response agency (e.g., a fire response agency), or a medical response agency (e.g., a hospital). This list is not exhaustive, and is provided for exemplary purposes only.

The features, processes, and methods described herein with respect to the capabilities of the vehicle control system may be implemented by a vehicle control tool running on the camera-based vehicle control system. The vehicle control tool may be a program, application, and/or combination of software and hardware that is incorporated on one or more of the components that comprise the vehicle control system. The vehicle control tool and the vehicle control system are described in more detail below (and collectively referred to as the vehicle control system for brevity).

Although the vehicle and the features corresponding to the vehicle control system described herein are described below in situations in which the vehicle is moving, it is also within the scope of this disclosure that the same features may apply when the vehicle is in a stationary state (e.g., parked, stopped at a red light, or stopped in traffic).

FIG. 1 is a flowchart of an example process or method 100 of operating the vehicle control system of the present disclosure. In various embodiments, the process 100 is represented by a set of instructions stored in one or more memories and executed by one or more processors (such as those described below in connection with FIG. 3). Although the process 100 is described with reference to the flowchart shown in FIG. 1, many other processes of performing the acts associated with this illustrated process 100 may be employed. For example, the order of certain of the illustrated blocks and/or diamonds may be changed, certain of the illustrated blocks and/or diamonds may be optional, and/or certain of the illustrated blocks and/or diamonds may not be employed.

In operation of this embodiment, the process 100 includes initiating a feature activation mode within the vehicle control system, as indicated by step 102. More specifically, in this example embodiment, the vehicle control system must be in feature activation mode for the vehicle control system to activate certain vehicle features through gesture recognition and voice command by a user. As described in greater detail below, in feature activation mode, the vehicle control system commands the vehicle cameras to detect a command from an authorized user.

Various embodiments of the present disclosure include multiple ways of initiating feature activation mode of the vehicle control system. In certain embodiments, the vehicle is constantly in feature activation mode. More specifically, in one embodiment, the vehicle control system is continuously polling for a new feature recognized by the camera. In another embodiment, the vehicle control system enables a user to activate feature activation mode from inside the vehicle.

In an alternative embodiment, the process 100 includes initiating a feature activation mode of the vehicle control system through a key fob apparatus. More specifically, in one example embodiment, a vehicle key fob apparatus (also referred to herein as a "key fob") is configured to provide a user with remote, keyless control of various operations or functions of the vehicle including, but not limited to, locking and unlocking the vehicle, opening and/or closing the windows, doors or trunk of the vehicle, turning on the radio or heating or air conditioning systems, initiating auto-unpark capabilities, etc. As will be appreciated, other vehicle functions may be controllable by the key fob and the present disclosure is intended to cover any and all such key fob operations.

In certain embodiments, a vehicle control system receives a signal to activate feature activation mode when a user actuates an input device on the keyfob. For example, in one embodiment, a key fob includes various input devices, including, but not limited to, buttons or push buttons, sliders, switches, knobs, dials, and/or touch input devices that can be operated by the user to control the various functions of the vehicle. In this example embodiment, the key fob includes an input device configured to initiate feature activation mode of the vehicle control system upon actuation.

Figure 3:
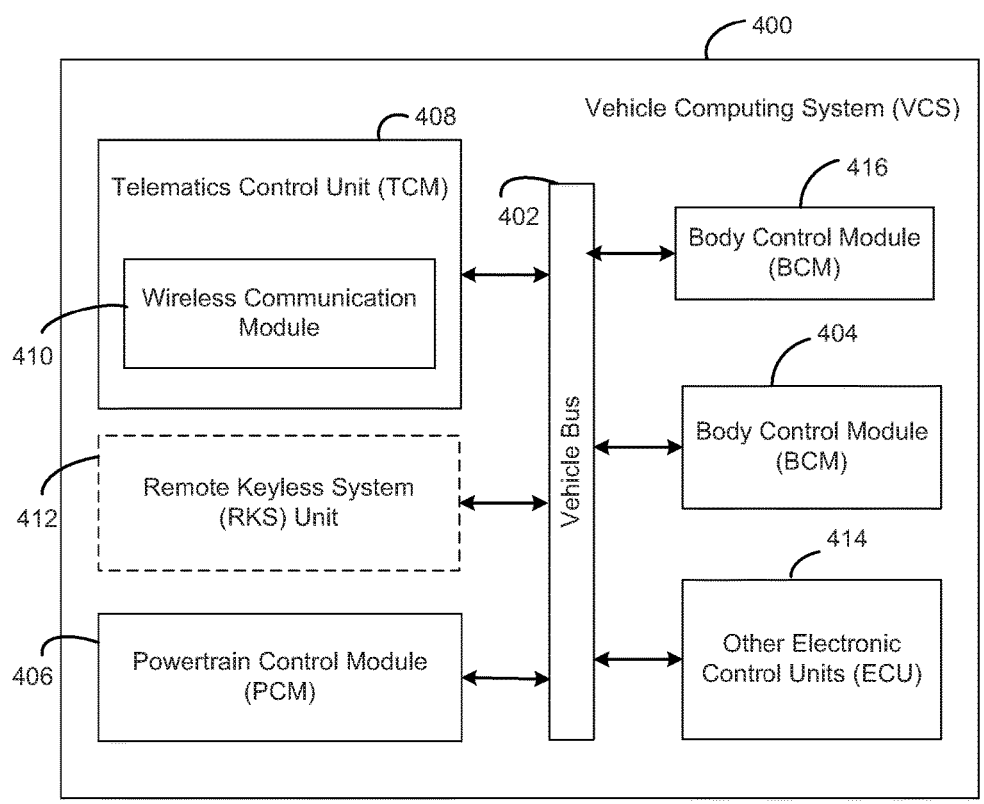
FIG. 3 is a block diagram of an example vehicle control system of the present disclosure in accordance with certain embodiments.

In another embodiment, the vehicle control system initiates feature activation mode by detecting keyfob proximity. More specifically, in one example embodiment, the key fob communicates directly with the vehicle to initiate the feature activation mode when a user is approaching the vehicle. In this example embodiment, as described in greater detail below, the user's command is transmitted to a vehicle body control module 404 (as depicted in FIG. 3) to begin sweeping for the key fob. The vehicle body control module sweeps for the key fob with a low-power antenna on the vehicle with a range of only a couple meters from the vehicle. When the user enters the range of the antenna sweep, the vehicle detects the key fob, authenticates the key fob, and if authenticated, initiates feature activation mode.

After the vehicle control system receives an input from the user to imitate feature activation mode, the vehicle control system authenticates the user as indicated by block 104. More specifically, in certain embodiment where the feature activation mode is imitated by a key fob, the if the antenna detects the signal from the key fob, the antenna authenticates the key fob by verifying that the detected key fob is associated with the vehicle. In other embodiment where the vehicle control system is in feature activation mode continuously or after the user enables the feature activation mode from inside the vehicle, the vehicle control system authenticates a user prior to searching for the gesture command.

Once in feature activation mode, a vehicle control system is configured to await a signal from a user to initiate some vehicle control feature through user gesture commands and voice commands. More specifically, once in feature activation mode, the vehicle control system awaits a gesture command by an authorized user. For example, in one embodiment, a user wishes to initiate the self parking feature of a vehicle and park the vehicle in the right side of a garage. In this example embodiment, the user initiates feature activation mode of the vehicle control system from inside the vehicle. Once in feature activation mode, the vehicle control system awaits a command from the user.

In this example embodiment, after the feature activation mode of the vehicle control system is initiated, the process 100 includes recognizing a gesture command, as indicated by step 106. In one embodiment, the vehicle control system is configured to operate with various cameras within the vehicle for feature command recognition. That is, a camera recognizes gestures that come from feet, pictures, or hand gestures like a form of sign language. For example, the camera may recognize gestures including, but not limited to, a thumbs up, a clap, an arm raised in a particular direction or at a particular angle.

The vehicle control system obtains gesture commands through a vehicle camera system. More specifically, the vehicle control system obtains image information, such as digital still images, streaming video, and/or digital video, via one or more suitable cameras (or other imaging devices, such as an autonomous vehicle's LIDAR or RADAR system or other forms of topology processing systems) on, integrated into, or otherwise associated with the vehicle. At least one of the cameras is oriented so as to obtain image information from a user in the vicinity of the vehicle. In certain embodiments (and as described in detail below), the one or more cameras are in communication with and configured to transmit the obtained image information to the processor of the vehicle control system to enable the processor to analyze the image information. In other embodiments (and as described in detail below), the one or more cameras are in communication with and configured to transmit the obtained image information to a memory device, which subsequently stores the image information. The processor may review the image information by accessing the memory device.

In certain embodiments, the camera system awaits the command for a designated period of time. If the designated period of time has elapsed, and the camera system does not receive a gesture command, the vehicle control system would time out (i.e., terminate the feature activation mode). More specifically, in certain embodiments, the camera system must receive a predetermined minimum amount of movement to keep from timing out. For example, if the vehicle user turns on the feature activation mode, and exits the vehicle, the user may then activate the feature (i.e., self park) if the camera system receives some minimal movement within a predetermined period of time. In this embodiment, if the camera system receives the movement within the predetermined period of time, the vehicle control system remains in feature activation mode. If the camera does not receive an indication of a movement within the predetermined period of time, the vehicle control system will time out. Such a configuration enables a user to initiate the feature activation mode, exit the vehicle to move something out of the path of the vehicle, and perform a gesture to activate the self park feature without the vehicle control system timing out.

It should be appreciated that in certain embodiments, the designated period of time is predetermined. In other alternative embodiments, the user modifies the designated period of time to a desired period of time. Such a configuration prevents the camera from continuously searching for a gesture command.

Continuing with the example described above, a user who wishes to activate the self park feature of the vehicle and have the vehicle parked in the right side of a garage would perform a gesture to activate the self park feature. In this example embodiment, the user shows a thumbs-up gesture to a vehicle camera.

After the camera obtains the user's gesture command, the vehicle control system receives the recognized gesture information from the camera to a processor within the vehicle control system to determine the vehicle feature that corresponds to the recognized gesture, as indicated by step 108. The processor within the vehicle control system analyzes the gesture data to determine which vehicle feature the gesture is associated with. More specifically, in certain embodiments, the processor determines the associated vehicle feature by searching a memory within the vehicle control system where user gesture commands and the associated vehicle features are stored. It should be appreciated that in certain embodiments, the gesture commands and associated vehicle features are preconfigured by the factory. In other embodiments, the vehicle control system enables a user to customize certain gesture commands for certain vehicle features.

It should be appreciated that to capture the gesture command, in certain embodiments, the vehicle camera system includes a camera on the inside of the vehicle. In one such embodiment, a display system inside the vehicle displays the user's gesture so that the user may verify that the camera is accurately capturing the gesture command. In other embodiments, the vehicle camera system includes a camera located on the outside of the vehicle. In one such embodiment, a user may use a mobile device, which is in communication with the vehicle control system, to display the captured gesture command. In other embodiments, the vehicle includes various factory suggested gestures from which the user may select which gesture is associated to which feature and verify it.

In an alternative embodiment, a user may use Bluetooth connection to the user's mobile device to record a gesture and activate the gesture via holding the user's mobile device and making the necessary motions. This would have the added benefit of allowing the user to have a longer distance for voice interaction as well. In certain embodiments, this mobile gesture command may be activated by an application on the mobile device directly. In other embodiments, the mobile gesture command may be activated by running in the background while the Bluetooth (or other communication method) is within range of the vehicle.

Returning to the example described above, the vehicle control system receives the recognized gesture information. More specifically, a processor within the vehicle control system receives information that a vehicle camera recognized a "thumbs-up" gesture by an authorized user. The processor of the vehicle control system determines that for this vehicle and this user, the thumbs-up gesture is associated with the vehicle self park feature.

In this example embodiment, after determining the vehicle feature that the recognized gesture command is associated with, the process 100 includes awaiting further voice commands to complete the activated vehicle feature, as indicated by block 110. The voice command in combination with the gesture command notify the vehicle control system of the feature to activate and the manner in which to perform the feature. More specifically, in the example embodiment described above, after receiving the thumbs up gesture command, and determining that the thumbs up is associated with the self park feature, the vehicle control system awaits voice commands to guide the vehicle with information about where to self-park. In this example, the user may say voice commands such as "right" to indicate to the vehicle control system to have the vehicle self park in the right side of a garage.

After analyzing the gesture command and the voice command, the vehicle control system relays the user's command to a the vehicle body control module to activate the vehicle feature associated with the user's command, as indicated by step 112. The vehicle body control module controls the vehicle feature. More specifically, when the user provides a gesture command and a voice command, the vehicle body control module to performs the feature activated by the gesture command. Such a configuration enables a user to control certain vehicle features through gesture commands and voice commands.

It should be appreciated that such a configuration enables a user to activate and control certain vehicle features from outside of the vehicle. In certain situations, certain features are more convenient to activate from outside of the vehicle. For example, in one embodiment, a user approaches the user's vehicle in a parking lot where the vehicle is parked in a tight parking spot. The user may use the key fob to wake up the vehicle and authenticate that the user is an approved user. Then the user performs the requisite gesture to activate the feature. In this example embodiment, the gesture may be a series of hand gestures to the side view camera. Upon activation of the "un-park" feature, the user may use voice commands to guide the vehicle from outside. For example, the user may indicate through voice commands, which direction the user wishes the vehicle faces after pulling out of the tight parking spot. The vehicle may then be unparked without the user entering the vehicle.

Figure 2:
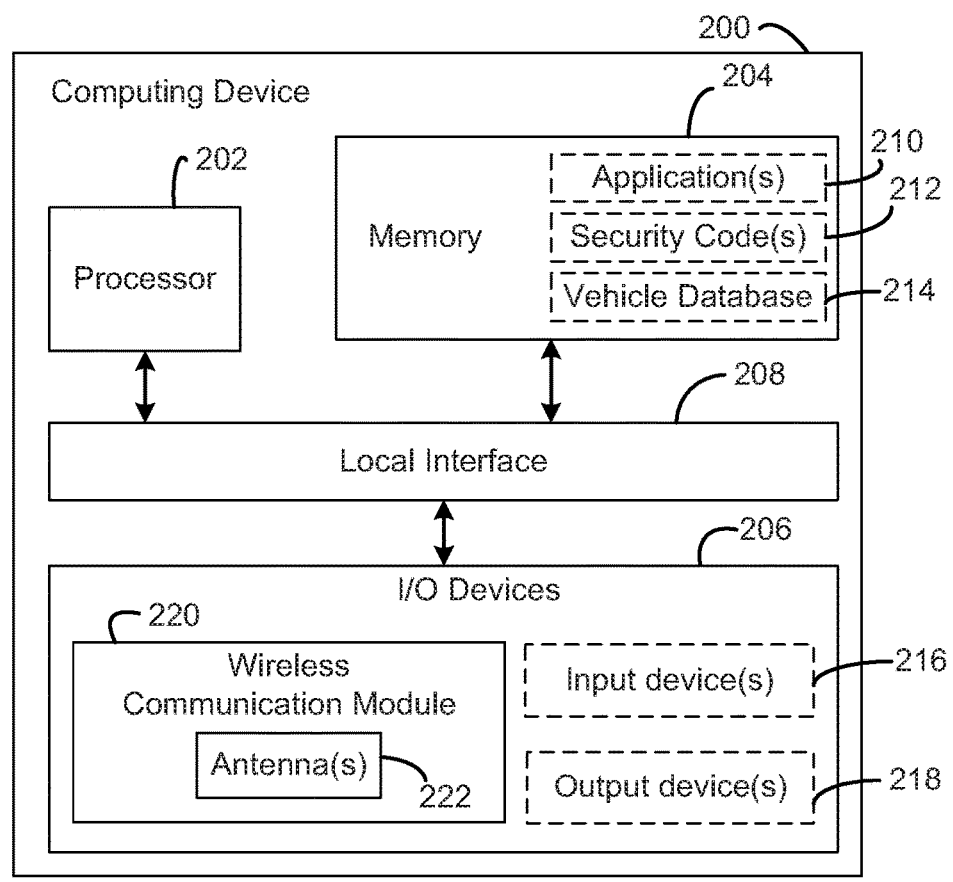
FIG. 2 is a block diagram of an example computing device included in one or more components of the system of the present disclosure, in accordance with certain embodiments.

Turning to FIG. 2, which illustrates an example computing device 200 for processing data or other inputs associated with the system of the present disclosure, for housing and executing software used to facilitate the vehicle control system 400 (as depicted in FIG. 3) of the present disclosure and the process 100 in accordance with embodiments. One or more instances of the computing device 200 may be utilized to implement any, some, or all of the components in the feature activation system and method of the present disclosure. In some embodiments, portions of the feature activation system and method of the present disclosure are implemented in software, as an executable program, and are executed by one or more special or general purpose digital computer(s), such as a mainframe computer, personal computer (desktop, laptop, or tablet-type computer), personal digital assistant, workstation, minicomputer, computer network, virtual network, Internet cloud computing facility, mobile telephone or smartphone, tablet, or other handheld computing device. In such cases, the computing device 200 may be representative of any computer in which the system resides or partially resides.

As an example, the computing device 200 may represent a computer included in the key fob for receiving vehicle command inputs and communicate with the vehicle. In one embodiment, the key fob includes a microphone to receive voice command inputs to the key fob to communicate vehicle controls with the vehicle. Likewise, the computing device 200 may represent a computer included in the vehicle control system 400 for storing, executing instructions, and communicating with the key fob, as well as receiving, processing, and executing vehicle commands received therefrom.

As shown in FIG. 2, the computing device 200 generally includes a processor 202, a memory 204, and one or more input and/or output (I/O) devices 206 (or peripherals) that are communicatively coupled via a local interface 208. The processor 202 is a hardware device and can be any custom made or commercially available processor, a central processing unit (CPU), an auxiliary processor among several processors associated with the computer 200, a semiconductor based microprocessor (in the form of a microchip or chip set), another type of microprocessor, or generally any device for executing software instructions. When the computing device 200 is in operation, the processor 202 can be configured to execute software stored within the memory 204, to communicate data to and from the memory 204, and to generally control operations of the computing device 200 pursuant to the software. The software, in whole or in part, but typically the latter, may be read by the processor 202, buffered within the processor 202, and then executed.

The memory 204 may include a computer readable medium for storing software for implementing the feature activation system and method of the present disclosure, and/or components thereof, and for implementing particular system transactions. For example, the memory 204 may be configured to store one or more separate programs (e.g., source program, executable program (object code), or script) comprising ordered listings of executable instructions for implementing logical functions associated with the system and method of the present disclosure. Furthermore, the software can be written as (a) an object oriented programming language, which has classes of data and methods, or (b) a procedural programming language, which has routines, subroutines, and/or functions, for example but not limited to, C, C++, C#, Pascal, Basic, Fortran, Cobol, Perl, Java, Ada, Python, and Lua. Components of the feature activation system and method of the present disclosure may also be written in a proprietary language developed to interact with these known languages. In the context of this document, a "computer-readable medium" may be any means that can store, communicate, propagate, or transport data objects for use by or in connection with the wireless system, and can even include paper having programming instructions printed thereon.

In some cases, the software in the memory 204 includes one or more applications 210 that are associated with the feature activation system of the present disclosure. As an example, the memory 204 of the vehicle control system 400 (described in greater detail below) can be utilized to implement one or more databases, such as, for example, a vehicle database 214 configured to store information associated with the vehicle, including for example, gesture command and voice command information associated with certain vehicle features, diagnostic information received from the TCU 408, GPS information received from a GPS satellite and associated with the vehicle, and the like.

In embodiments, the memory 204 includes any one or a combination of volatile memory elements (e.g., random access memory (RAM, such as DRAM, SRAM, SDRAM, etc.)) and nonvolatile memory elements (e.g., ROM, hard drive, tape, CDROM, etc.). Moreover, the memory 204 may incorporate electronic, magnetic, optical, and/or other types of storage media. In some cases, the memory 204 can have a distributed architecture where various components are situated remote from one another, but are still accessed by the processor 202.

The local interface 208 may be, for example, but is not limited to, one or more buses or other wired or wireless connections, as is known in the art. The local interface 208 may have additional elements, which are omitted for simplicity, such as controllers, buffers (caches), drivers, repeaters, and receivers, to enable communications. Further, the local interface 208 may include address, control, and/or data connections to enable appropriate communications among the other computer components.

The I/O devices 206 may include interactive hardware that is internal to the computing device 200, or external and connected wirelessly or via connection cable and/or I/O ports. The input devices 216 may include any suitable input devices that enable a driver or a passenger of the vehicle to input modifications or updates to information referenced by the vehicle control system 400 as described herein. The input devices 216 may include, for instance, a control knob, an instrument panel, a keyboard, a scanner, a digital camera for image capture and/or visual command recognition, a touch screen, an audio input device (e.g., cabin microphone), buttons, a mouse, or a touchpad, input modules for programmable logic controllers (PLCs), radio-frequency device readers. Furthermore, the I/O devices 206 may also include output devices 218, for example but not limited to, output modules for PLCs, displays, haptic devices (e.g., actuators), lights (e.g., LEDs; such as, for example, the output devices 117), audio output devices (e.g., speakers), etc.

The I/O devices 206 further comprise devices that communicate with both inputs and outputs, including, but not limited to, a wireless communication module 220. The wireless communication module 220 includes one or more antennas 222 configured to wireless transmit signals to, and/or receive signals from, at least other components of the feature activation system and method of the present disclosure. The wireless communication module 220 further includes one or more receivers, transmitters, and/or transceivers (not shown) that are communicatively coupled to the one or more antennas 222 for processing the received signals, providing the transmitted signals, or otherwise facilitating wireless communication with other components of the feature activation system and method of the present disclosure. The wireless communication module 220 may also include a modulator/demodulator (modem; for accessing another device, system, or network, such as, e.g., another component within the feature activation system and method of the present disclosure), a bridge, and/or a router.

The exact type of wireless communication technology included in the wireless communication module 220 can vary depending on the computing device 200 and may include at least one of short-range wireless communication technology (such as, e.g., radio frequency (RF), Bluetooth, infrared, and/or NFC technology) and longer-range or broadband wireless communication technology (such as, e.g., WiFi, WiMax, other wireless Ethernet, cellular, GPS, and/or satellite technology). In some cases, the wireless communication module 220 may include more than one antenna and corresponding transceiver in order to communicate over different wireless networks.

In some cases, the computing device 200 can also include hardware for implementing one or more aspects of the techniques described herein. In such cases, the hardware utilizes any of the following technologies, or a combination thereof, which are each well known in the art: a discreet logic circuit(s) having logic gates for implementing logic functions upon data signals, an application specific integrated circuit (ASIC) having appropriate combinational logic gates, a programmable gate array(s) (PGA), a field programmable gate array (FPGA), etc.

Referring now to FIG. 3, which illustrates an example vehicle control system (VCS) 400 that may be included in a vehicle, in accordance with embodiments. The VCS 400 includes various electronic control units (ECUs) that are responsible for monitoring and controlling the electrical systems or subsystems of the vehicle, as described in more detail below. In embodiments, the ECUs 414 of the VCS 400 are interconnected by a vehicle bus 402 (such as, e.g., a controller area network (CAN) bus) for passing data to and from the various ECUs 414, as well as other vehicle and/or auxiliary components in communication with the VCS 400. Each ECU 414 may include, for example, one or more inputs and outputs for gathering, receiving, and/or transmitting data, a memory for storing the data, and a processor for processing the data and/or generating new information based thereon.

In the illustrated embodiment, the VCS 400 includes a camera for obtaining user gesture commands. The camera 416 is in communication with the processor 202 and the memory 204 of a computing device 200 within the VCS (not show in FIG. 3). The camera 416 communicates with the processor 202 and memory 204 of the computing device 200 of the VCS 400 through the local interface 208.

In the illustrated embodiment, the VCS 400 includes a body control module (BCM) 404 for controlling and monitoring various electronic accessories in a body of the vehicle. In embodiments, the BCM 404 is an ECU that controls the doors of the vehicle, including locking, unlocking, opening, and/or closing said doors. In some embodiments, the BCM 404 also controls the power windows, power roof (e.g., moonroof, sunroof, convertible top, etc.), and interior lighting of the vehicle. The BCM may also be used for vehicle features such as self park and un-park features. The BCM 404 may also control other electronically-powered components in the body of the vehicle, such as, for example, air-conditioning units, power mirrors, and power seats. The BCM 404 can be configured to implement the user's vehicle commands received through gesture commands and voice commands from the user that are related to the doors, windows, or other body components controlled by the BCM 404.

As shown in FIG. 3, the VCS 400 can further include a power train control module (PCM) 406 for controlling and monitoring the engine and transmission of the vehicle. In some embodiments, the PCM 406 can be separated into two separate ECUs, specifically an engine control unit and a transmission control unit. In either case, the PCM 406 can be configured to control starting and stopping of the engine of the vehicle, including receiving commands to start the engine from gesture commands and voice commands from the user.

As shown in FIG. 4, the VCS 400 further includes a telematics control unit (TCU) 408, which is an ECU for enabling the vehicle to connect to various wireless networks, including, for example, GPS, WiFi, cellular, Bluetooth, NFC, RFID, satellite, and/or infrared. In embodiments, the TCU 408 (also referred to as a "vehicle telematics unit") includes a wireless communication module 410 comprising one or more antennas, modems, receivers, and/or transmitters (not shown) for connecting to the various wireless networks. For example, the wireless communication module 410 can include a mobile communication unit (not shown) for wirelessly communicating over a cellular network (e.g., GSM, GPRS, LTE, 3G, 4G, CDMA, etc.), an 802.11 network (e.g., WiFi), a WiMax network, and/or a satellite network. The TCU 408 can also be configured to control tracking of the vehicle using latitude and longitude values obtained from a GPS satellite.

In embodiments, the TCU 408 receives external data, including vehicle commands, via the wireless communication module 410 and provides the external data to an appropriate ECU of the VCS 400. For example, if the TCU 408 receives a lock door command, the TCU 408 sends the command to the BCM 404 via the vehicle bus 402. Likewise, if the TCU 408 receives a start engine command, the TCU 408 sends the command to the PCM 406 via the vehicle bus 402. In some embodiments, the TCU 408 also receives internal data from other ECUs of the VCS 400, or a processor (not shown) of the VCS 400, with instructions to transmit the internal data to a remote server or another component of the wireless system.

The wireless communication module 410 can be capable of wirelessly communicating over two or more networks to ensure continuity of network access, for example, in case one of the networks fail or are out of range. Moreover, the vehicle commands may be received at different receivers of the wireless communication module 410 depending on the wireless communication technology being used to transmit the command. For example, commands and/or data transmitted by the key fob to the vehicle may be received at a Bluetooth receiver (not shown) of the wireless communication module 410. Likewise, data may be transmitted from the TCU 408 to the key fob using a Bluetooth transmitter (not shown) included in the wireless communication module 410, and data may be transmitted from the TCU 408 to a remote server using a cellular or WiFi transmitter (not shown) included in the wireless communication module 410.

The VCS 400 can further include a remote keyless system (RKS) unit 412 for controlling and monitoring remote, keyless interactions between the key fob and the vehicle.

The RKS unit 412 can include a remote keyless entry system and in some cases, a remote keyless ignition system. In the latter case, the RKS unit 412 may also be referred to as a "passive entry passive start (PEPS) system." In some embodiments, the RKS unit 412 is a separate, stand-alone ECU that is interconnected to the BCM 404, PCM 406, TCU 408, and other ECUs 414 of the vehicle via the vehicle bus 402 in order to carry out the RKS/PEPS operations. For example, the RKS unit 412 may receive vehicle commands from the key fob via the TCU 408, process the commands to identify the appropriate ECU for carrying out the command, send the command to the identified ECU, and confirm performance of the command. In other embodiments, the RKS unit 412 may be comprised of multiple segments that are incorporated into various ECUs of the VCS 400, such as, for example, the BCM 404, the PCM 406, and/or the TCU 408, to process the RKS/PEPS commands received at each ECU. In still other embodiments, the RKS unit 412 may be included within one ECU, such as, e.g., the TCU 408, in order to handle or process RKS/PEPS commands as they are received by the wireless communication module 410 of the TCU 408.

Any process descriptions or blocks in the figures, should be understood as representing modules, segments, or portions of code which include one or more executable instructions for implementing specific logical functions or steps in the process, and alternate implementations are included within the scope of the embodiments described herein, in which functions may be executed out of order from that shown or discussed, including substantially concurrently or in reverse order, depending on the functionality involved, as would be understood by those having ordinary skill in the art.

It should be emphasized that the above-described embodiments, particularly, any "preferred" embodiments, are possible examples of implementations, merely set forth for a clear understanding of the principles of the invention. Many variations and modifications may be made to the above-described embodiment(s) without substantially departing from the spirit and principles of the techniques described herein. All such modifications are intended to be included herein within the scope of this disclosure and protected by the following claims It should be emphasized that the above-described embodiments, particularly, any "preferred" embodiments, are possible examples of implementations, merely set forth for a clear understanding of the principles of the invention. Many variations and modifications may be made to the above-described embodiment(s) without substantially departing from the spirit and principles of the techniques described herein. All such modifications are intended to be included herein within the scope of this disclosure and protected by the following claims.

The invention claimed is:

1. A vehicle comprising:
a wireless communication module to obtain a gesture command and a voice command from a user located outside of the vehicle;
a vehicle control system configured to:
  receive the gesture command representative of motion of the user recorded by a mobile device from the mobile device communicatively coupled to the wireless communication module;
  determine a vehicle feature associated with the gesture command;
  activate the determined associated vehicle feature;
  subsequently receive the voice command from a microphone; and
  supplement the activated vehicle feature based on the voice command.

2. The vehicle of claim 1, wherein the vehicle control system initiates a feature activation mode to receive obtained gesture command information from the mobile device.

3. The vehicle of claim 2, wherein the vehicle control system initiates the feature activation mode by detecting a key fob proximate to the vehicle.

4. The vehicle of claim 2, wherein the user initiates the feature activation mode of the vehicle control system from within the vehicle.

5. The vehicle of claim 2, wherein the vehicle control system is further configured to terminate the feature activation mode in response to not receiving the gesture command within a predetermined period of time.

6. The vehicle of claim 1, wherein the associated vehicle feature includes self-parking.

7. The vehicle of claim 6, wherein the voice command guides the activated self-parking feature.

8. The vehicle of claim 1, wherein the vehicle control system is to verify that the user is an authorized user prior to activating the feature associated with the obtained gesture command and voice command.

9. The vehicle of claim 1, wherein the vehicle control system further comprises a body control module.

10. The vehicle of claim 9, wherein the body control module activates the vehicle feature associated with the obtained gesture command.

11. The vehicle of claim 1, wherein the wireless communication module is to cause the mobile device to display the received gesture commands captured by the mobile device.

12. A method of operating a vehicle feature activation system of a vehicle, comprising:
obtaining from a mobile device communicatively coupled to the vehicle, a gesture command representative of motion of a user recorded by the mobile device;
activating a vehicle feature associated with the gesture command;
subsequently receiving, by a vehicle control system, a voice command from a user; and
supplementing the activated vehicle feature based on the voice command.

13. The method of claim 12, wherein the vehicle control system initiates a feature activation mode to receive obtained gesture command information from the mobile device.

14. The method of claim 13, wherein the vehicle control system initiates the feature activation mode by detecting a key fob proximate to the vehicle.

15. The method of claim 13, wherein the user initiates the feature activation mode of the vehicle control system from within the vehicle.

16. The method of claim 12, wherein the associated vehicle feature includes self-parking.

17. The method of claim 16, wherein the voice commands guide the activated self-parking feature.

18. The method of claim 12, wherein the vehicle control system verifies that the user is an authorized user prior to activating the feature associated with the obtained gesture command and voice command.

19. The method of claim 12, wherein the vehicle control system further comprises a body control module.

20. The method of claim 19, wherein the body control module activates the vehicle feature associated with the obtained gesture command and voice command.

\* \* \* \* \*

UNITED STATES PATENT AND TRADEMARK OFFICE
CERTIFICATE OF CORRECTION

PATENT NO. : 10,166,995 B2
APPLICATION NO. : 14/991523
DATED : January 1, 2019
INVENTOR(S) : Brandon Beauvais et al.

Page 1 of 1

It is certified that error appears in the above-identified patent and that said Letters Patent is hereby corrected as shown below:

In the Claims

In Column 12, Line 9, in Claim 3, please delete and replace the text as shown:
The vehicle of claim 2, wherein the vehicle control system initiates
a feature activation mode by detecting a key fob proximate to the vehicle.

Signed and Sealed this
Ninth Day of April, 2019

Andrei Iancu
*Director of the United States Patent and Trademark Office*